United States Patent [19]

Rotilio

[11] 4,202,438
[45] May 13, 1980

[54] FLEXIBLE CONVEYOR SYSTEM

[76] Inventor: James V. Rotilio, 329 Hackensack St., Carlstadt, N.J. 07072

[21] Appl. No.: 818,445

[22] Filed: Jul. 25, 1977

[51] Int. Cl.² .................. B65G 43/08; B65G 33/26
[52] U.S. Cl. ............................. 198/524; 198/676; 222/64; 414/295
[58] Field of Search ............ 198/524, 676, 675, 670, 198/659, 657, 660, 857; 222/64, 65; 214/17 CA, 18.2; 414/295

[56] References Cited

U.S. PATENT DOCUMENTS

| 2,354,647 | 8/1944 | Blusson | 198/524 |
| 3,095,097 | 6/1963 | Mellow | 198/524 X |
| 3,381,801 | 5/1968 | Rastein | 198/659 |

FOREIGN PATENT DOCUMENTS

| 2207296 | 8/1972 | Fed. Rep. of Germany | 198/657 |
| 24023 | of 1892 | United Kingdom | 198/657 |

*Primary Examiner*—Robert B. Reeves
*Assistant Examiner*—Douglas D. Watts

*Attorney, Agent, or Firm*—Martha G. Pugh

[57] ABSTRACT

This discloses a system for lifting or conveying granular, pulverized or fluid material from a first location to a second location. A long flexible tube, open at the ends, encloses a highly flexible rotary driven helical coil spring equipped at parallel, spaced-apart positions along its length with a plurality of attachments, called "portable flights", which may comprise a shallow cylindrical cup formed from a pair of semicircular plates. The cups are secured to a succession of rungs in angularly staggered relation along the length of the helical spring, and serve to pick up and convey a substantial quantity of the pulverized, granular or fluid material from an input container, in which the tube is immersed, to a product chute near the top of the tube leading into a collection hopper. As an alternative feature for granular or pulverized material, when the pile in the hopper collects above a preselected level, a metal paddle or deflection ring is deflected, operating a toggle switch, turning off the motor which rotates the helical spring. When the pile of material falls below a given level, the toggle switch is turned on, reoperating the conveyor motor.

4 Claims, 10 Drawing Figures

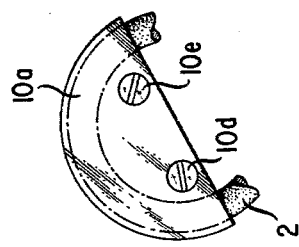
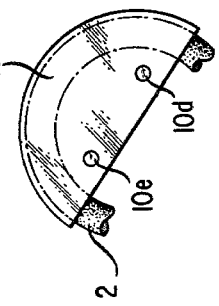
FIG. 4A
FIG. 4B
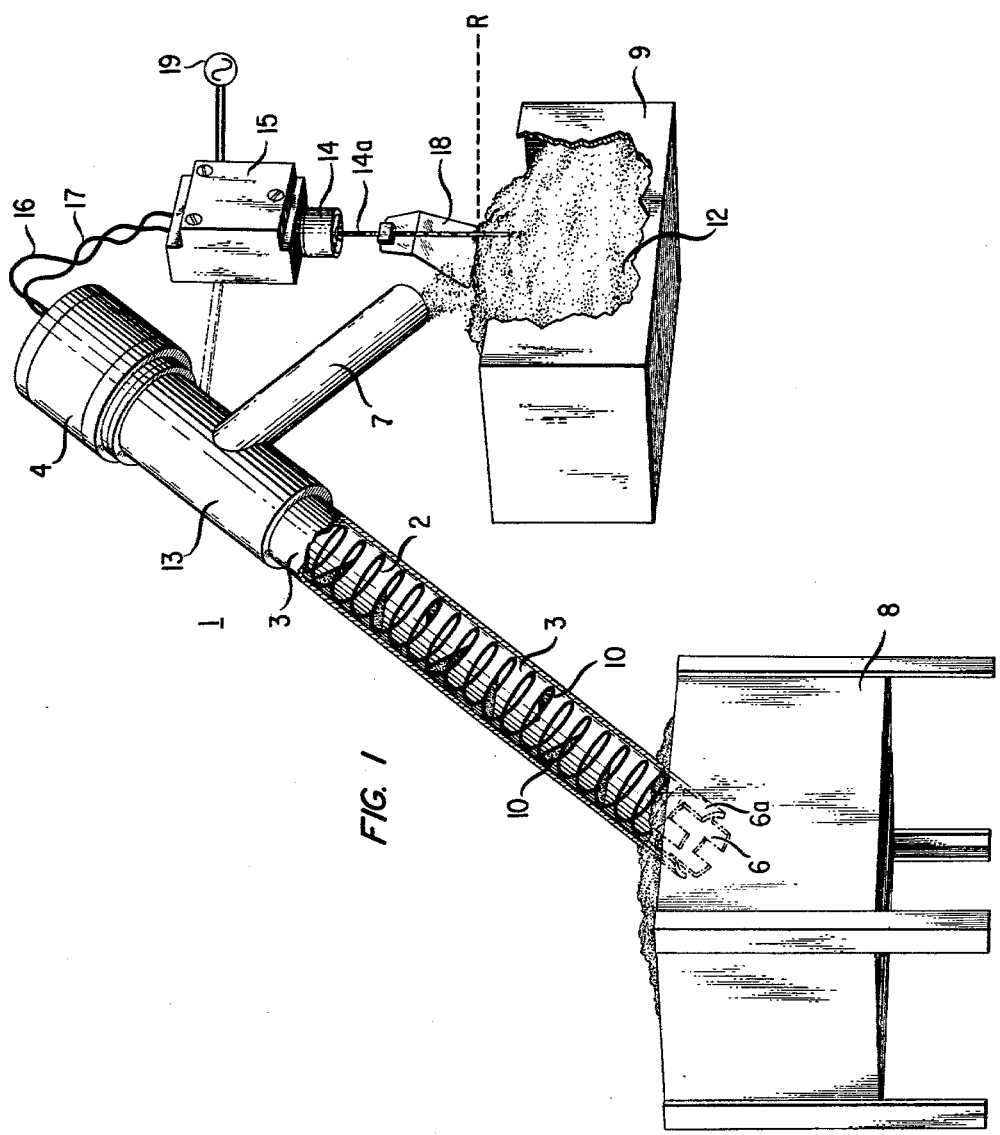
FIG. 1

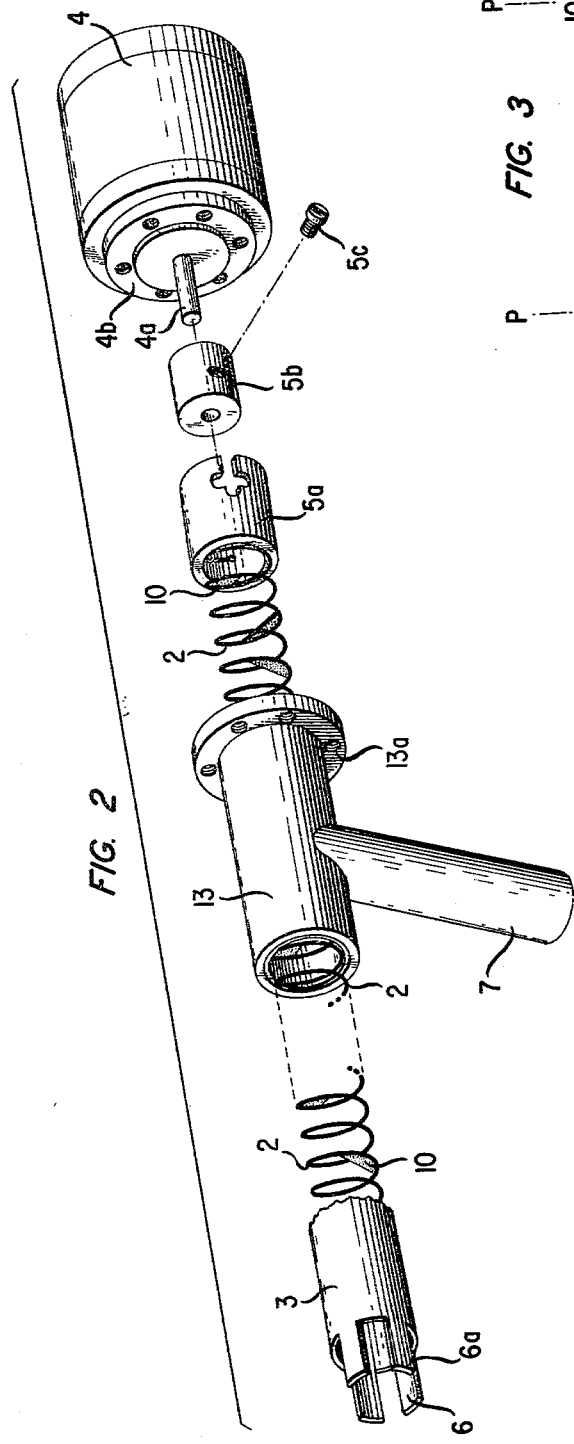
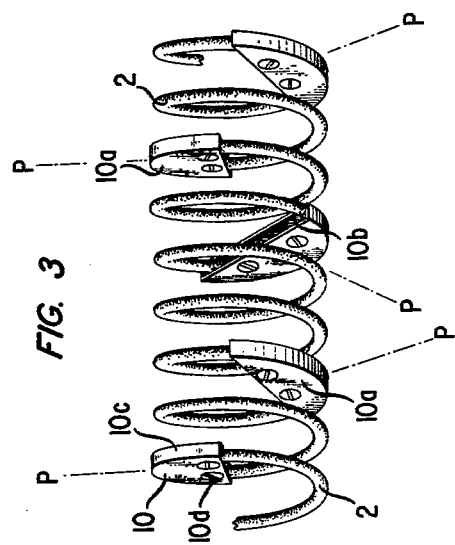
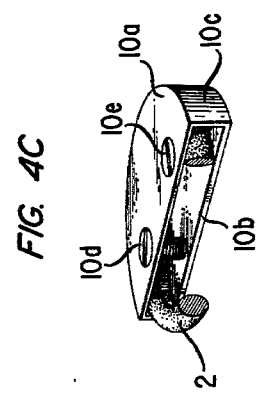

FLEXIBLE CONVEYOR SYSTEM

BACKGROUND OF THE INVENTION

This invention relates in general to conveying systems for moving quantities of granular, pulverized or fluid material from one point to another and, more particularly, to systems in which the feeding member is helical in form.

Conveying systems comprising rotating helical means encased in a long flexible tube are well-known in the prior art, as disclosed, for example, in U.S. Pat. No. 3,381,801 issued May 7, 1968 to B. Rastoin, in which a flexible core is disposed within the rotating helix in fixed axial relationship to the enclosing flexible tube. Such systems are used, for example, for filling freight cars or trucks with pulverized coal or grain from stockpiles of the same, or for conveying such materials from one point to another during processing.

A system of the type disclosed by Rastoin has the disadvantage that a portion of the material to be conveyed tends to fall down between the rungs of the rotating helix, causing a loss in efficiency of the system. Moreover, it may be fairly expensive to manufacture a flexible tube including a fixed axial core of the type required by Rastoin. In addition, operation of the system requires constant monitoring to prevent the output container from overfilling.

SUMMARY OF THE INVENTION

It is, therefore, the principal object of this invention to provide an improved conveyor system employing a rotary helix for granular, pulverized or fluid material. A more specific object is to provide a conveyor system which is more efficient than prior art systems of a similar type. Another object of the invention is to provide a system which is cheaper to build and install than similar prior art systems. Still another object of the invention is to provide a system of the type described which is operable on a semiautomatic basis, without the need for constant control by an operator to turn the motor on and off.

These and other objects are realized in accordance with the present invention in a conveyor system for granular, pulverized or fluid material, which includes a long, flexible helical coil spring driven to rotate inside of a flexible tube in which rungs of the helical spring are equipped at spaced-apart positions with flat semicircular inserts known as "portable flights" of any solid material, such as metal or plastic, disposed in parallel relation to enhance the pick-up and delivery of material by the coils. In preferred example, the inserts take the form of shallow semicylindrical cups, each formed of a pair of semicircular plates coupled together by a semicylindrical side wall. The insert cups are bolted to one rung in every few, the orientation of the inserts being in staggered angular relation along the length of the helical spring. For example, assuming the first portable flight insert to be disposed in a given reference position, the next in order will be rotated in a horizontal plane through an angle of 120°, the third, through an angle of 240° and the fourth will be aligned with the first. It will be understood that the number of rungs between each pair of portable flight inserts and their specific angular orientations are matters of choice which can be varied according to the requirements of each system.

In operation, one end of the tubular conveyor is thrust into a pile or container of source material, which is conveyed to an output chute by the rotating helical spring modified by the portable flights of the present invention. Assuming that the output chute leads into a collecting container, the material accumulates in a pile, above which is disposed a metal paddle or deflection ring mounted on the depending extension of a toggle switch. When the material collected in the pile rises to a preselected reference level, the paddle or deflection ring is pushed up, operating the toggle switch to turn off the motor, so that the conveyor ceases to operate. When the pile decreases below the reference level, the paddle or deflection ring returns to its original position, operating the toggle switch to turn on the motor.

A particular advantage of the present invention is that it greatly increases the efficiency of the conveyor system by reducing the amount of material which falls back through the coils of the rotating helical spring during operation of the system.

Another advantage of the disclosed conveyor system is that it is relatively inexpensive to manufacture and assemble, in that the axial core required in certain prior art systems, such as that of Rastion U.S. Pat. No. 3,381,801, is eliminated.

A further feature of the invention is that it is adapted for semiautomatic operation, requiring minimum control by an operator.

These and other objects, features and advantages will be apparent to those skilled in the art by a study of the attached drawings with reference to the detailed specification hereinafter.

BRIEF DESCRIPTION OF THE DRAWINGS

FIG. 1 is an overall showing of a helical coil spring conveyor system in accordance with the present invention in which the coils are modified to include inserts called portable flights;

FIG. 2 shows the conveyor tube of FIG. 1 including details of the helical coil spring including the portable flights of the present invention;

FIG. 3 is an enlarged portion of the helical coil spring of the present invention showing the portable flights in place;

FIGS. 4A and 4B show the upper and lower surfaces of a portable flight member of the present invention screwed into place on a coil rung;

FIG. 4C is a perspective showing of a portable flight insert in accordance with the present invention, in place on the coil rung;

In FIG. 6B, the chute 7 and switch assembly 14,15 have been removed for a clearer view.

DETAILED DESCRIPTION

Figure 5A:
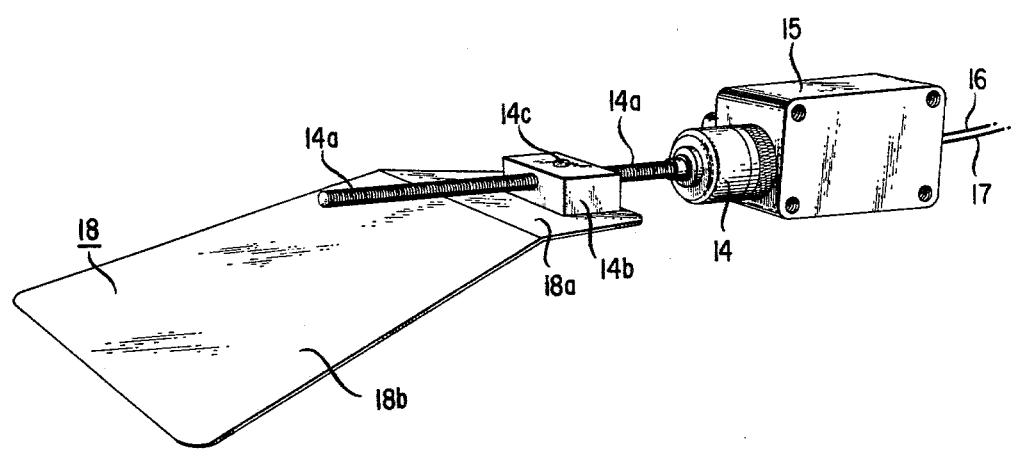
FIGS. 5A and 5B are enlarged perspective showings, from the bottom and top respectively, of the paddle and microswitch combination of FIG. 1.

Referring in detail to the drawings, there is shown in FIG. 1 a conveyor system 1 in accordance with the present invention, a principal element of which is a coil spring 2, which in the present illustrative embodiment is, say, 36 feet long, and is formed of stainless steel wire 3/16" thick, the coils of which have an overall outer diameter of 1⅜" and a pitch of 1⅜" between the centers of the windings.

Referring to FIG. 2, the upper end of the spring 2 is fixed to the outer bushing 5a, which is welded or otherwise secured to a motor driven inner bushing 5b, the latter being secured to the shaft 4a of a conventional motor 4 by, for example, a setscrew 5c. In the present embodiment, the motor 4 has a rating of several horsepower, although it will be understood that the horsepower rating will depend on the weight of the material to be lifted and the speed at which it is to be conveyed.

Upon assembly, the outer and inner bushings 5a,5b are enclosed in a cylindrical metal housing 13, of stainless steel or the like, having an inner diameter just exceeding 1⅝" and an outer diameter, say, 1¾". At the upper end of metal tubular housing 13 is an annular flange 13a which is screwed or otherwise secured to the annular flange 4b of motor housing 4.

The coil spring 2 is surrounded coaxially by a flexible tubular housing 3, which, in the present embodiment, is of a flexible plastic material, such as nylon, 1⅝" in outer diameter, having a wall thickness of 1/16" and extending coaxially along the length of coil spring 2. It will be understood that the flexible tubular housing 3 can be formed of any other plastic material, such as high density polyvinylchloride, or alternatively of a flexible metal conduit, such as corrugated stainless steel, or any of the other types well-known in the art. At its upper end, the flexible tubular housing 3 is welded or otherwise secured to the inner perimeter of metal tubular housing 13.

The lower end 6 of the flexible tubular housing 3 terminates in a probe comprising a series of slats with intervening slots 6a, extending to a depth of about 6" in a direction parallel to the principal axis of flexible tubular housing 3.

About 8" below the motor housing 4 on the metal tubular housing 13, just below the lower end of bushing 5a, is centered an output chute 7 which takes the form of a tube, which may be of the same material as the external tubular housing 13. In the present embodiment, the chute 7 is, say, 4" in outer diameter, 1/16" in wall thickness and several feet long, being downwardly disposed at an angle of, say, 60° to the principal axis of metal tubular housing 13, although it will be understood that in a practical embodiment the angular direction and the length and width dimensions of output chute 7 may be adjusted in accordance with the physical requirements of the site.

A particular feature of the present embodiment is the presence of a series of attachments 10 called "portable flights", which are disposed in spaced-apart positions along the length of the coil 2, in the manner indicated in FIGS. 2 and 3 of the drawings. In the present embodiment, as shown in FIGS. 4A, 4B and 4C, the portable flights 10 each comprise a pair of substantially parallel semicircular plates 10a and 10b of nylon or similar plastic material, about 1½" in diameter and 1/16" thick. These are welded or otherwise secured to the ends of a semicylindrical sidewall 10c of the same wall thickness, forming therewith a cup 1⅝" in outer diameter, 7/16" in overall depth and 5/16" in inner depth. Each of the portable flights 10 is fitted snugly over one of the rungs of the coil spring 2, as shown in FIGS. 3, 4A, 4B and 4C, and is securely screwed into place by two nylon screws 10d and 10e. It will be understood that the portable flights 10 can be formed of any suitable substantially rigid material, such as plastic, metal, wood or other synthetics. As an alternative to the shallow cups described, the portable flights 10 may take the form of simple semicircular plates, rivetted or otherwise secured to a series of rungs of coil spring 2.

In the present embodiment, as shown in FIG. 3, the portable flights 10 are located on alternate rungs along the length of the coil spring 2. It will be understood, however, that the distribution along the length of the coil can be in any desired sequence, such as one in every one, two, three, four, five or more rungs. Although preferred, the sequence need not be regular or periodic.

Further, in accordance with a preferred arrangement, the orientation of the portable flights 10 is varied in a regular sequence from one to the next, along the length of coil spring 2, in the manner shown in FIG. 3. For example, if the first in the series is disposed with reference point P in a given position, the next portable flight above it is disposed with reference point P rotated 120° in a clockwise direction in a plane substantially normal to the principal axis of the coil; the next in the series is disposed with point P rotated 240° clockwise; and the next is disposed with point P returned to the initial position. Thereafter, the series is repeated along the length of coil spring 2. It will be apparent that the angular relationship between successive members of the series can be varied in any desired way, so that there may be as few as two portable flights, or as many as five or more portable flights, to each repetitive series along the length of the coil. On the other hand, the angular orientation of the portable flights may be completely random.

Referring again to FIG. 1 of the drawings, there is shown another novel feature of the present invention. The tubular exhaust chute 7 is disposed to deposit transported granular or pulverized material in a pile 12 which may be collected, for example, in a container 9. In order to reduce the personnel required to monitor operation of the system to prevent spillover of the material collected in container 9, a microswitch 15, disposed to be operated by a toggle mechanism 14, is suspended by a bracket from the frame of the conveyor, or otherwise supported above the site where the pile of material 12 is deposited by the exhaust chute 7. A flexible lever arm 14a, which comprises a flexible rod several inches to a foot or so in length, is connected to depend from conventional toggle switch 14. The latter supports at its lower end an angularly bent paddle 18 which is adjusted by setscrew means 14c so that the bottom surface of paddle 18 is substantially tangential to a desired maximum horizontal reference level of the pile 12 in container 9. When the pile 12 accumulates above the reference level, the arm 14a is deflected so as to move the conventional toggle switch 14, which is mechanically coupled to open-circuit conventional microswitch 15. The latter is connected in series with one terminal of a conventional source of either alternating-current or direct-current power 19, which is connected to drive the motor 4 to rotate its shaft 4a. (See FIG. 2)

Figure 5B:
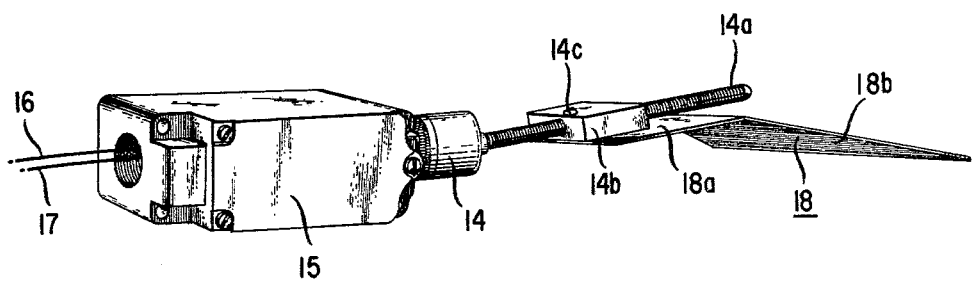

FIGS. 5A and 5B are detailed showings of the microswitch-toggle switch paddle assembly. In the present illustrative embodiment, the paddle 18 is formed of any rigid material, preferably a sheet of metal, such as stainless steel, say, 0.035" thick. The rectangular connecting portion 18a is 2" along the edge by 3" wide; and the outwardly extending tongue 18b is bent at an internal angle of, say, 135° to the principal plane of 18a, extending outwardly about 4", and being tapered outwardly to a width of about 3½" at the external end. The supporting block 14b, which is ½" by 1" by 1", may also be of steel or the like, and is welded or otherwise secured in centered relation to the rear face of 18a. A central bore in supporting block 14b, which is substantially vertical in unoperated position of paddle 18, accommodates the flexible lever 14a in slidable relation, so that the position of 14b can be adjusted along the length of 14a by a setscrew 14c.

Referring again to FIG. 1, when the pile 12 accumulates above the reference level R, the bottom of paddle 18 is contacted and pushed up, deflecting the lever arm 14a of toggle switch 14, so that the microswitch 15 is tripped, cutting off power from the source 19 to the motor 4. This stops the conveyor. When the height of pile 12 is reduced below the reference level, the toggle switch is released, again closing the microswitch 15, causing the motor to again operate the conveyor mechanism.

Figure 6A:
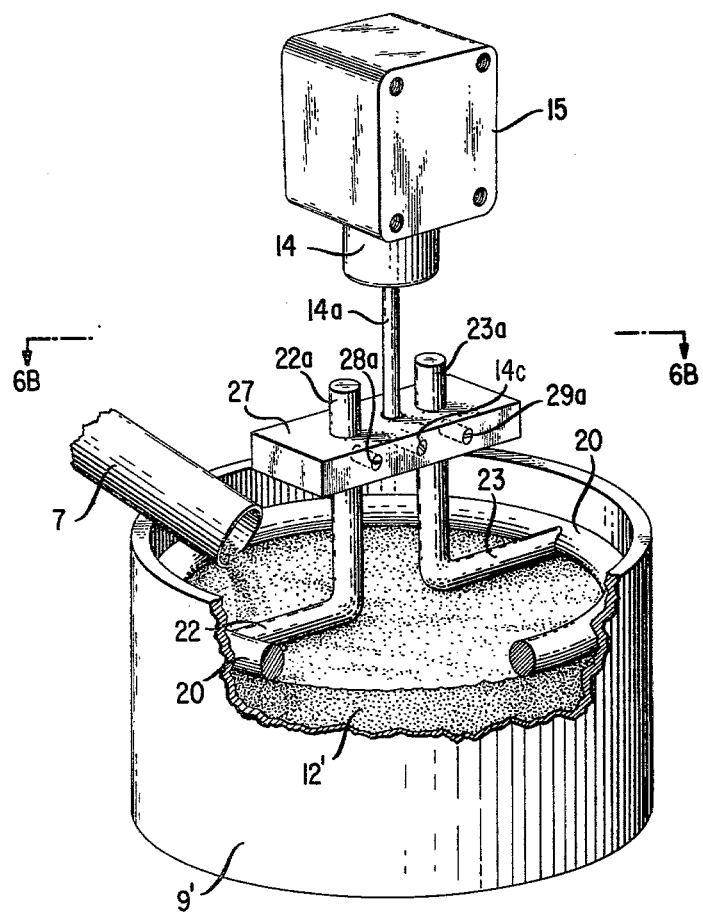
FIGS. 6A and 6B of the drawings show, in perspective and top view respectively, a partial modification of the combination disclosed in FIGS. 5A and 5B, in which a deflection ring and lever system replaces the paddle.
Figure 6B:
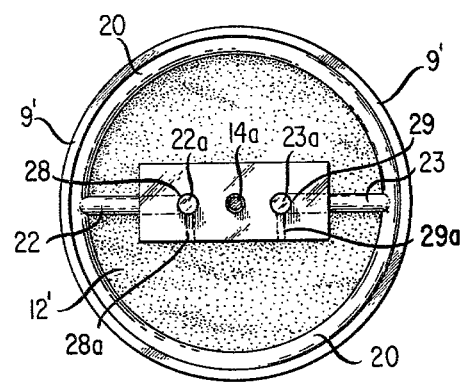

An alternative to the paddle 18, namely, deflectable ring 20, is shown in FIGS. 6A and 6B of the drawings.

In the alternative embodiment about to be described, the output or collection container 9 of FIG. 1 is replaced by a round barrel-like container 9', as shown in FIG. 6A. A metal ring 20 of stainless steel or the like, having an outer diameter of, say, 12" and an inner diameter of, say, 11½", being ¼" round in cross-section, is disposed in a horizontal plane around the inner periphery of the barrel 9' so as to be substantially contiguous with the inner walls thereof, but having sufficient clearance from the walls to prevent sticking. The deflector ring 20 is disposed at the reference level R to respond to the desired maximum height for the material pile 12'.

Disposed diametrically across from each other in container 9' are a pair of L-shaped rods 22 and 23, which may also be of stainless steel, ¼" round in cross-section, having their external ends welded or otherwise secured at diametrically opposite positions to the inner periphery of ring 20. Arms 22 and 23 extend inwardly for about 5" on each side to form a pair of elbow bends, providing parallel, vertical legs 22a and 23a, spaced apart about 1½" and each extending upwardly about, say 2 feet. The upper ends of legs 22a and 23a are respectively threaded through a pair of parallel bores, which are symmetrically spaced on opposite sides of the central bore in a rectangular block 27, in which the flexible toggle switch lever 14a rides and is secured by setscrew 14c, as in the embodiment of FIGS. 5A and 5B. The block 27 may be, for example, of stainless steel, ¼" thick, 1" wide and 2" long. The legs 22a and 23a move slidably in their respective parallel bores, and are respectively each secured in a desired position by setscrews 28a and 29a.

It will be apparent that in this embodiment, deflecting ring 20 has the advantage of responding to material in the pile 12, rising above the reference level R, regardless of where it accumulates in a horizontal plane.

It will be understood that the present invention is not limited to the specific embodiments or elements thereof which have been described herein by way of illustration, but only by the scope of the appended claims.

What is claimed is:

1. A conveyor system for moving granular, pulverized or fluid material from a first position to a second position, which comprises in combination:
    an elongated flexible tube including means for receiving said material at one of said positions and means for expelling said material at or near the other said positions,
    a flexible helical spring enclosed in said tube and extending coaxially along the length of said tube,
    means for driving said helical spring to rotate about its longitudinal axis relative to the inner surface of said tube,
    said flexible helical spring including a plurality of portable flights inserted between adjacent coils of said spring in repetitive serial relation at spaced-apart positions along the length of said spring,
    each of said portable flights comprising a pair of semicircular disks of substantially rigid material connected at their external peripheries by a semicircular wall, forming between them a shallow semicylindrical cup inserted internally over one of the rungs of said spring, and means for securing said cup to said rung in a plane transverse to the principal axis of said spring for continuously picking up said material at said receiving means and delivering said material to said expelling means when said spring is driven to rotate about its axis.

2. The subcombination comprising a portable flight constructed and arranged for use with a conveyor system comprising a rotatable helical spring for moving granular, pulverized or fluid material from a first position to a second position,
    said portable flight comprising at least one semicircular disk, and
    means for securing said portable flight in fixed relation between adjacent coils of said helical spring,
    wherein said last-named means comprises said portable flight constructed from a pair of parallel semicircular disks connected together at their external peripheries by a semicircular wall, forming between them a shallow semicircular cup which fits over one of the rungs of said spring, and means for bolting said cup to said rung.

3. A conveyor system for moving granular, pulverized or fluid material from a first position to a second position, which comprises in combination:
    an elongated flexible tube including means for receiving said material at one of said positions and means for expelling said material at or near the other said position,
    a flexible helical spring enclosed in said tube and extending coaxially along the length of said tube,
    means for driving said helical coil to rotate about its longitudinal axis relative to the inner surface of said tube,
    said flexible helical spring including a plurality of portable flights including substantially plane members inserted between adjacent coils of said helical spring at spaced-apart positions along the length thereof, for continuously picking up said material at said receiving means and delivering said material to said expelling means when said spring is driven to rotate about its axis,
    means for controlling said driving means which comprises in combination:
    electromechanical switching means having an "on" position and "off" position connected to said driving means,
    an elongated flexible lever connected at one end to said switching means whereby deflection of said flexible lever in one direction moves said switching means from "on" to "off" position, and deflection of said lever in the opposite direction moves said lever from "off" to "on" position,
    means mechanically coupled to said lever and disposed adjacent said expelling means for contact with and deflection by a pile of said material collected out of said expelling means for deflecting said lever at a preselected level of said collected material, whereby to turn said switching means to "off" position when said material is above said preselected level, and turn said switching means to "on" position when said material is below said preselected level, wherein said means mechanically coupled to said lever comprises a deflecting ring disposed in a plane substantially transverse to the principal vertical axis of said pile of material, said plane being substantially tangential to said pile of material at a preselected level of said pile whereby at least a portion of said ring is contacted and deflected by said pile at said preselected level.

4. The combination in accordance with claim 3 wherein said means mechanically coupled to said lever includes a supporting block having a central bore connected in centered slidable relation to the elongated flexible lever of said switching means, a pair of lateral bores disposed substantially parallel to and symmetrically spaced on opposite sides of said central bore, a pair of L-shaped rods having a substantially transversely disposed pair of legs connected to positions in substantially diametrical relation on said deflecting ring, the other pair of upwardly extending legs of said L-shaped rods being disposed to ride in slidable relation in the lateral bores of said pair, whereby movement of said deflecting ring deflects said L-shaped rods, causing deflection of said block and said elongated flexible lever, thereby to operate said electromechanical switching means.

* * * * *